United States Patent [19]

Tilby et al.

[11] Patent Number: 5,173,122
[45] Date of Patent: Dec. 22, 1992

[54] APPARATUS FOR WASHING SUGARCANE BILLETS

[76] Inventors: Sydney E. Tilby, 989 Wagonwood Drive, Victoria, Canada, V8X 4M1; David G. Jansson, 4415 Laguna Pl. Apt. 208, Boulder, Colo. 80303

[21] Appl. No.: 637,343

[22] Filed: Jan. 4, 1991

[51] Int. Cl.⁵ .............................. B01J 3/00; B08B 3/06
[52] U.S. Cl. ............................................ 127/2; 134/65; 134/153
[58] Field of Search ................. 127/2; 241/14, 79, 69, 241/235, 236, 155, 157; 460/24, 113, 150; 134/61, 65, 132, 153

[56] References Cited

U.S. PATENT DOCUMENTS

| | | | |
|---|---|---|---|
| 2,192,912 | 3/1940 | Howie | 366/228 |
| 2,816,742 | 12/1947 | Richterkessing et al. | 259/89 |
| 3,284,282 | 11/1966 | Immel | 241/69 |
| 3,545,687 | 12/1970 | Mosby | 241/69 |
| 3,698,459 | 10/1972 | Tilby | 146/119 |
| 4,073,301 | 2/1978 | Mackinnon | 134/65 |
| 4,124,168 | 11/1978 | Bialski et al. | 241/14 |
| 4,188,130 | 2/1980 | Engels | 366/228 |
| 4,193,700 | 3/1980 | Wirz | 366/156 |
| 4,430,003 | 2/1984 | Beattie et al. | 366/173 |
| 4,472,272 | 9/1984 | Capannoli | 209/268 |
| 4,522,498 | 6/1985 | Mendehall | 366/4 |
| 4,719,933 | 1/1988 | Jackson | 134/65 |
| 4,936,513 | 6/1990 | Smith | 241/69 |
| 4,971,449 | 11/1990 | Hendren | 366/228 |
| 5,020,555 | 6/1991 | Nishibyashi | 134/65 |
| 5,054,506 | 10/1991 | Shakeri | 134/132 |

Primary Examiner—Theodore Morris
Assistant Examiner—P. L. Hailey
Attorney, Agent, or Firm—Jansson & Shupe, Ltd.

[57] ABSTRACT

A sugarcane billet washing apparatus tumbles and thoroughly washes billets moving through a container in a continuous stream. Washing is by sprayers extending along the container. Preferred embodiments include the container being tilted to facilitate throughput, and a used water handling apparatus. The apparatus is suitable for use with continuous, integrated sugarcane processing systems.

5 Claims, 2 Drawing Sheets

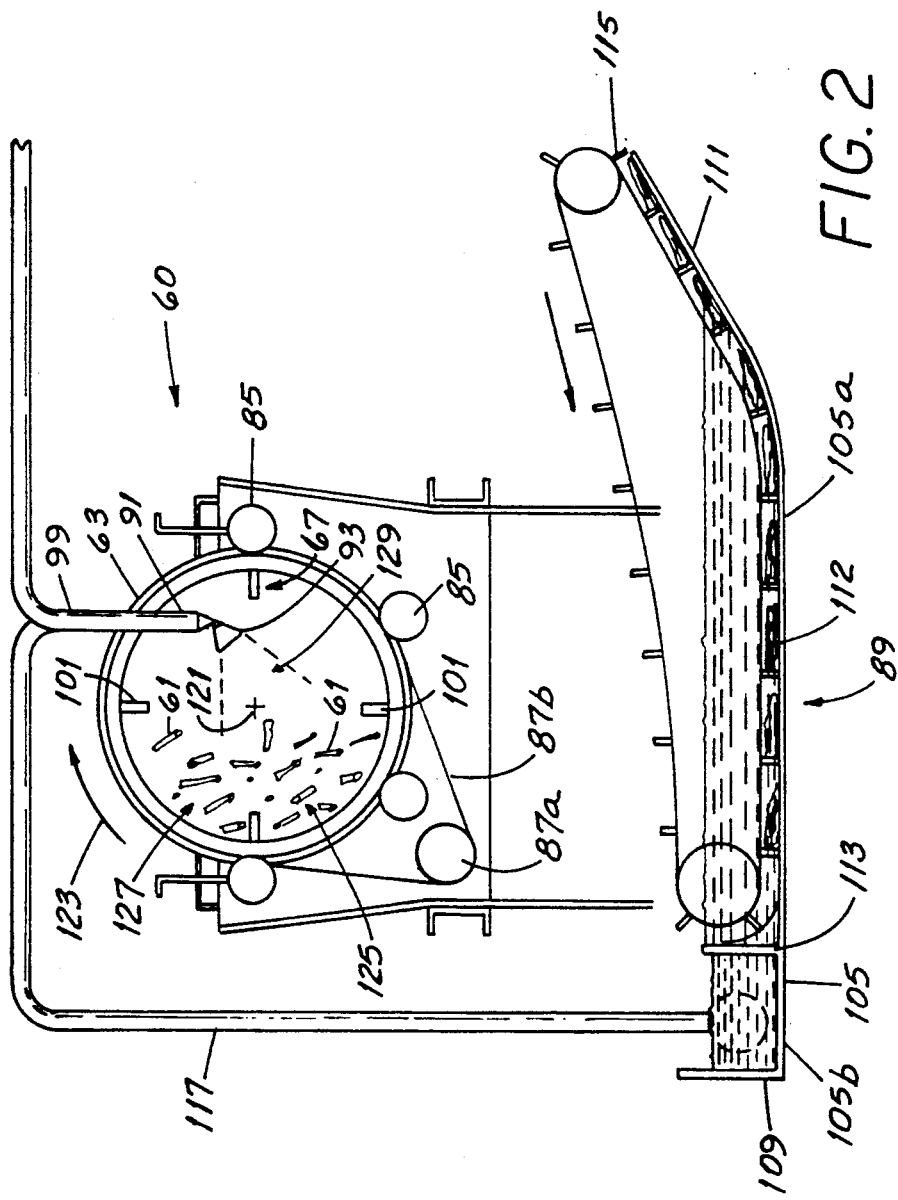

APPARATUS FOR WASHING SUGARCANE BILLETS

FIELD OF THE INVENTION

This invention is related generally to sugarcane processing and, more particularly, to an apparatus for thoroughly washing sugarcane which has been cut to billets.

BACKGROUND OF THE INVENTION

Stalks of sugarcane plants and the like are processed to yield several types of products including food products. A primary product of the sugarcane plant is sugar used as human food and made from juice extracted from the pith of the stalk. The woody fibers and the waxy epidermal layer of the stalk are used to make a variety of other products. Certain other plants (e.g., sweet sorghum) are similar to sugarcane in that they are grasses having woody grass stalks and are processed to yield a wide variety of products. While there is frequent reference herein to sugarcane, it is to be understood that this invention applies to processing of woody grass stalks like sugarcane and sweet sorghum or certain of their constituents. At no point, including the claims, is any reference to sugarcane to be limiting.

In many areas of the world, sugarcane is harvested by hand by grasping the stalk and severing it near its base with a machete. The cane cutter then rests the freshly-cut butt end of the stalk on the ground while leaves and the top of the stalk are removed. The stalks are then dropped in windrows for machine or hand-loading into carts or trucks.

Placement of the freshly cut end of the stalk on the earth causes the stalk to pick up dirt at the area of contact. The sugarcane stalk can also become dirty when rainfall splashes mud and particles of soil up onto the lower portion of the growing stalk.

An early step in the process of making useful products from sugarcane stalks involves cutting the stalk into billets. It is apparent from the foregoing that irrespective of whether the sugarcane is harvested by hand or mechanically, at least the lowermost billets cut from a stalk will be unsuitably dirty unless washed.

Apparatus exists for washing mud and dirt from the entire unbilleted sugarcane stalk but such apparatus has been found unsuitable for use with cane stalks which have been cut to billets. Irrespective of the process used to obtain products from such billets, they should be thoroughly washed before further processing. This is especially important when such billets are used to make food products for human consumption.

An improved apparatus for thoroughly washing sugarcane billets would be an important advance in the art.

OBJECTS OF THE INVENTION

It is an object of this invention to overcome some of the problems and shortcomings of the prior art.

Another object of this invention is to provide an apparatus for washing sugarcane billets before further processing of such billets.

Another object of this invention is to provide an apparatus for washing sugarcane billets used to make food products for human consumption.

Another object of this invention is to provide an apparatus for washing sugarcane billets whereby all exposed portions of each billet are washed to remove dirt.

Another object of this invention is to provide an improved apparatus for washing sugarcane billets wherein such apparatus is suitable for use in a high-throughput operation.

Yet another object of this invention is to provide an improved apparatus for washing sugarcane billets wherein such apparatus is suitable for use in a continuous process.

These and other important objects will be apparent from the descriptions of this invention which follow.

SUMMARY OF THE INVENTION

In general, the improved apparatus for washing sugarcane billets comprises a container for receiving sugarcane billets to be washed, means to emit water in a spray in such container and means to randomly re-orient such billets within the container to expose all portions of the billets to sprayed water. Means are provided to move the billets from the charging end of the container toward its discharge end as the container is rotated. Substantially the entire surface of each billet is washed by the apparatus to remove dirt adhering to the billets. Washed billets flow continuously from the container and therefore, the apparatus is suitable for use with continuous, integrated sugarcane processing systems.

The container has a longitudinal axis about which the container is rotatably driven by a motor. Such container also has a pair of annular support rings, one at either end, and a generally cylindrical heavy mesh screen extending between the rings. The openings through the screen are sufficiently small to prevent billets from falling out of the container and yet large enough to permit water to freely run through the screen to the used-water handling apparatus located below.

The means to emit water preferably includes a spray bar mounted in a fixed position inside the container and extending along substantially the entire length of such container. In that way, billets throughout the container are simultaneously washed. The spray bar has a plurality of spray outlets (preferably positionally-adjustable) and isolation valves spaced along its length. The purpose of the isolation valves is described below.

The means to randomly re-orient billets includes a plurality of inwardly projecting vanes mounted in such container for tumbling the billets as the container rotates. Such vanes are long, relatively narrow, rigid plates attached to the inside of the container and extending from its charging end toward (but not to) its discharge end. Such vanes are generally parallel to the axis of rotation of the container and spaced about 90° apart.

In a highly preferred embodiment, the moving means includes the charging end being at a level above the discharge end for gravitational movement of billets. Continuous billet movement thereby makes the apparatus suitable for use in an integrated, continuous sugarcane processing system. Such tilting of the container is by manually operated jacks located at one end or by similarly-positioned motorized jacks, the latter lending themselves to remote control schemes using position feedback.

A used-water handling apparatus is positioned below the container and collects water already used for billet washing. Such apparatus includes a settling tank for separation of reusable water from sludge and a drawing tank adjacent to the settling tank. The settling tank provides a weir over which relatively sludge-free water flows to feed the drawing tank. An endless conveyor means is provided in the settling tank for removing sludge therefrom (along with a certain amount of water), thereby facilitating continuous operation of the billet washing apparatus.

The spray bar has a first input end for receiving water flow from the drawing tank through a conduit. It also has a second input end connected to a source of fresh water. Any one of the isolation valves may be closed to adjust the relative quantities of fresh water and used water being sprayed. In that way, overflow of the settling tank and drawing tank can be prevented while yet giving the billets a final wash with fresh water before they are discharged from the container.

Further details of the inventive billet washing apparatus are set out below.

BRIEF DESCRIPTION OF THE DRAWINGS

FIG. 2 is a front elevation view of the apparatus taken along the viewing axis 2—2 of FIG. 1 with parts shown in cross section.

DETAILED DESCRIPTIONS OF PREFERRED EMBODIMENTS

Figure 1:
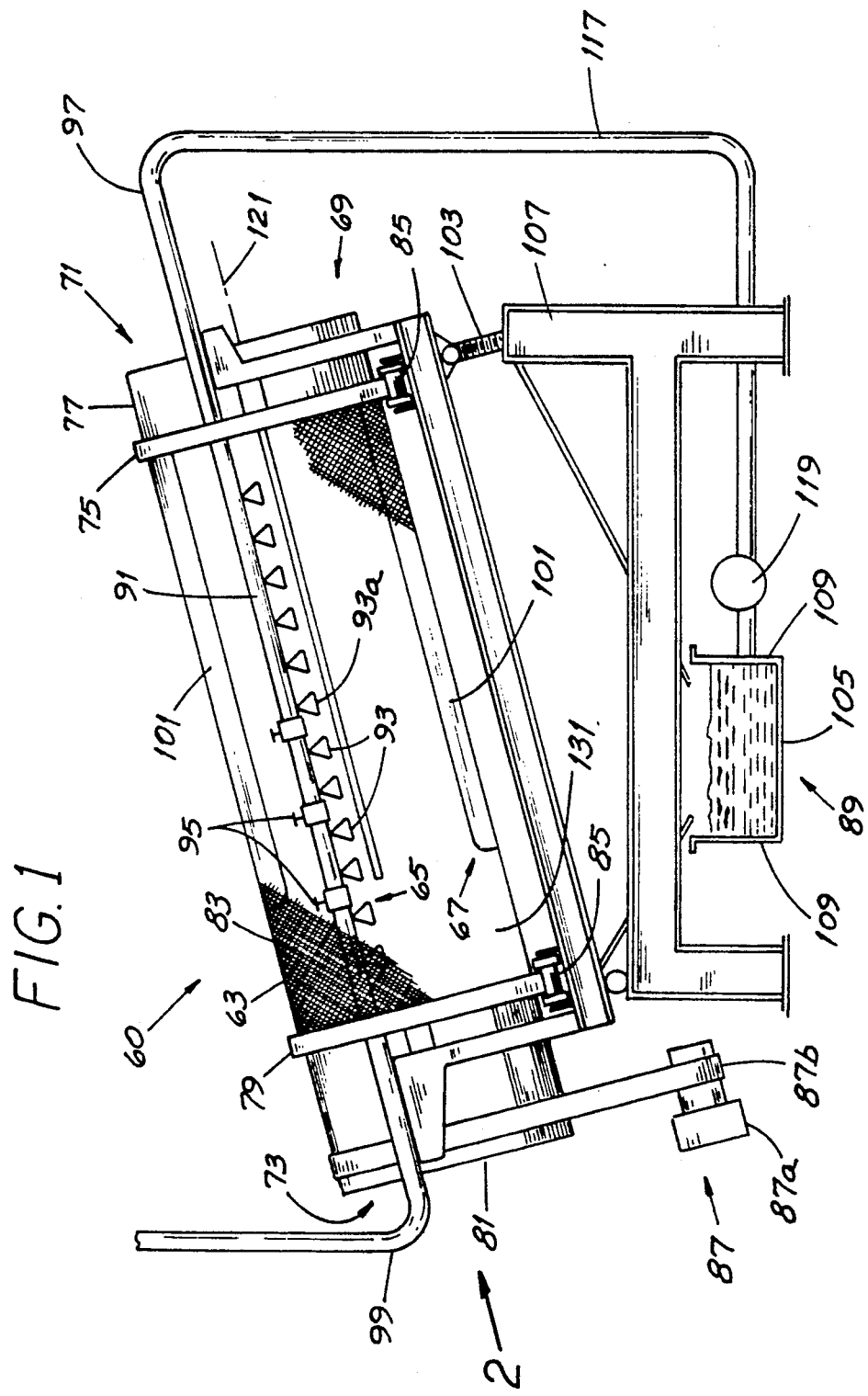
FIG. 1 is a side elevation view of the improved apparatus with parts shown in cross section and other parts broken away.

Referring to FIGS. 1 and 2, the improved apparatus 60 for washing sugarcane billets 61 includes a container 63 for receiving such billets 61, means 65 for emitting sprayed water to wash the billets 61 and means 67 for randomly re-orienting such billets 61 within the container 63 to expose all portions of them to sprayed water. The apparatus 60 also includes means 69 to move the billets 61 from the charging end 71 toward the discharge end 73 of the container 63 as the container 63 is rotated.

In a highly preferred embodiment, the container 63 includes a first annular support ring 75 with an annular charging mouth 77 concentrically attached thereto. The container 63 also includes a second annular support ring 79 and an annular, chute-like discharge mouth 81 concentrically attached thereto. A generally cylindrical heavy mesh screen 83 is concentrically supported between the rings 75, 79.

Each ring 75, 79 is supported at each of several points by a flanged idler roller 85 which permits the container 63 to rotate while at the same time substantially restricting its movement in other directions. A drive mechanism 87 is mounted adjacent the discharge mouth 81 and includes a drive motor 87a and drive belt or chain 87b coupling the motor 87a in driving engagement with the discharge mouth 81. Such motor 87a may be of the fixed or variable speed type, the latter lending itself to remote control. Ways in which cylindrical, drum-type containers 63 are supported and driven for rotation are well known and need not be further described.

Selection of the screen 83 is made in view of several factors. One factor is that the openings through the screen 83 are sufficiently small to prevent a cane billet 61 from falling through. That is, such openings should be slightly smaller than the minimum diameter of the cane billets 61 to be washed in the apparatus 60. When the size of the openings is so selected, they will readily permit wash water and dirt to fall through the screen 83 and pass to the used-water handling apparatus 89 below. Another factor affecting screen selection is mechanical strength and rigidity in that such screen 83 should be sufficiently sturdy to be self supporting and to withstand the rigors of continuous billet tumbling and washing.

The container 63 also includes means 65 for emitting water in a spray and in a highly preferred arrangement, such means 65 includes a spray bar 91 mounted in a fixed position and made of a straight length of pipe or tubing having a plurality of spray outlets 93 spaced along it. The outlets 93 are preferably embodied as spray heads 93a which are individually positionally adjustable. The spray bar 91 extends along substantially the entire length of the container 63 so that billets 61 throughout the container 63 are simultaneously washed.

The spray bar 91 also includes a plurality of isolation valves 95 located between the first input end 97 and the second input end 99 of the bar 91. As described in greater detail below, the first end 97 receives used water from the used water handling apparatus 89 and the second end 99 receives fresh water.

The means 67 for randomly re-orienting billets includes a plurality of inwardly projecting vanes 101 mounted in the container 63. Each vane 101 is formed of a long, relatively narrow, rigid plate securely attached to the screen 83 and extending radially inward. Such vanes 101 are spaced about 90° apart around the interior perimeter of the container 63. Such vanes 101 extend from the charging mouth 77 about 70% of the distance toward the discharge mouth 81. Vanes 101 arranged in the foregoing manner will assure that a portion of the container length adjacent the discharge mouth 81 is devoid of vanes 101. The reason for such construction is described below.

The improved apparatus 60 also includes means 69 to move billets 61 from the charging end 71 toward the discharge end 73 as the container 63 is rotated. In one highly preferred embodiment, such means 69 for moving billets 61 includes the charging end 71 being at a level above the discharge end 73. With such arrangement, the billets 61 gravitationally move downward along the length of the container 63 as they are being tumbled and washed. When fully washed billets 61 reach the discharge end 73, they are automatically ejected. Such arrangement makes the apparatus 60 suitable for use in a continuous sugarcane processing system.

Raising the charging end 71 (or lowering the discharge end 73) is by manually operated jacks 103. However, motorized jacks may be used in place thereof and such motorized jacks lend themselves to remote control with position feedback, if desired. From the foregoing, it will be appreciated that the "dwell time" that billets 61 are within the container 63 can be controlled by controlling the speed of rotation, the angle of container tilt or both. It will also be appreciated that other means to move billets 61 may be used. For example, the container 63 may be equipped with long-pitch, auger-like "flights" which tumble billets 61 and urge them toward the discharge end 73.

The used-water handling apparatus 89 includes a tank 105 positioned between container 63 and its support stand 107. Such tank 105 has three vertical walls 109 an inclined wall 111, all of which cooperate to contain water and dirt which flows out of the container 63. The used-water tank 105 includes a settling tank 105a for separation of reusable water from sludge 112 and a drawing tank 105b adjacent to the settling tank 105a. The settling tank 105a provides a weir 113 over which relatively clean water flows to feed the drawing tank 105b.

As dirty water flows into the settling tank 105a, it is held rather quiescent and sludge 112 formed of dirt and other fines settles to the bottom of the tank 105a. Such sludge 112 is periodically removed (along with some water) by an endless drag-chain conveyor 115. Such arrangement also facilitates continuous operation of the apparatus 60.

The drawing tank 105b is connected by a conduit 117 and water pump 119 to the first end 97 of the spray bar 91 and a source of fresh water is connected to the second end 99 of the bar 91. Closure of any one of the isolation valves 95 permits selection of the relative quantities of recycled water and fresh water which are sprayed on the billets 61. This arrangement helps assure that the drawing tank 105b is prevented from overflowing while yet providing at least some fresh water wash before the billets 61 are ejected from the container 63.

In operation and referring particularly to FIG. 2, the container 63 is charged with a quantity of billets 61 placed in the container 63 at the charging end 71. The container 63 has an axis of rotation 121, is driven in the direction shown by the arrow 123 and may be said to have a lift zone 125 and a tumbling zone 127. The spray bar 91 is spaced above and to the right of the rotational axis 121 of the container 63. The angular width of the spray zone 129 and the positions of the spray heads 93a are selected so that substantially the entirety of the lift zone 125 and the tumbling zone 127 receive spraying water.

The speed of container rotation and the inwardly projecting height of the vanes 101 are selected so that cane billets 61 are lifted through the zone 125 and brought to the zone 127 from which they tumble and fall by force of gravity through the spray zone 129. This repetitive lifting and tumbling action randomly re-orients the billets 61 so that all portions of them are exposed to water spray for washing. As the billets 61 approach the discharge end 73, that portion 131 of the container 63 which is devoid of vanes 101, they are washed with fresh water and become relatively quiescent; that is, they are no longer randomly re-oriented by vanes 101. Avoiding random re-orientation near the discharge end 73 helps eject the billets 61 smoothly from the discharge end 73.

From the foregoing, it will be apparent that while the improved apparatus 60 is optimized for a continuous cane processing system, it can also be used in a "batch" system. That is, the container 63 may be oriented with its axis 121 horizontal and billets 61 placed in the charging end 71 for tumbling and washing. Upon the completion of washing, billets 61 may be removed by hand or by tilting the container 63 to permit the billets 61 to fall out the discharge end 73.

While the principles of this invention have been described in connection with specific embodiments, it should be understood clearly that these descriptions are made only by way of example and are not intended to limit the scope of the invention.

We claim:

1. Apparatus for washing sugarcane billets comprising:
   a container for receiving sugarcane billets to be washed and having a discharge end with a quiescent region adjacent thereto;
   a used-water handling apparatus for collection of water already used for washing;
   a spray bar having a first input end for receiving used water from the used-water tank and a second input end for receiving fresh water thereby to selectively emit fresh and recycled water in a spray in such container;
   valve means to adjust the relative quantities of fresh water and used water being sprayed; and,
   means to randomly re-orient such billets moving toward the quiescent region,
   whereby substantially the entire surface of each billet is washed to remove dirt adhering thereto and such billets are easily discharged from the apparatus.

2. Apparatus for washing sugarcane billets comprising:
   a container for receiving sugarcane billets to be washed:
   a spray bar to emit water in a spray in such container;
   used water handling apparatus including (a) a settling tank for separation of reusable water from sludge and having a weir feeding a conduit (b) a drawing tank adjacent to the settling tank and having a conduit fed by the weir and extending from the drawing tank to the spray bar;
   and endless conveyor in the settling tank for removing sludge therefrom;
   means within the container to randomly re-orient such billets and expose all portions thereof to sprayed water,
   whereby substantially the entire surface of each billet is washed to remove dirt adhering thereto.

3. Apparatus for washing sugarcane billets comprising:
   a container for receiving sugarcane billets to be washed and having a discharge end with a quiescent region adjacent thereto;
   means for selectively emitting fresh and recycled water in a spray in such container, the means including a spray bar with a plurality of spray outlets spaced therealong and a water input at each end thereof; and,
   means to randomly re-orient such billets moving toward the quiescent region to expose all portions of the billets to sprayed water,
   whereby substantially the entire surface of each billet is washed to remove dirt adhering thereto.

4. The apparatus of claim 3 wherein each spray outlet comprises a spray head and the spray bar includes at least one isolation valve for selecting spray of fresh and recycled water.

5. The apparatus of claim 4 wherein the spray heads are positionally adjustable.

* * * * *